United States Patent
Kato (10) Patent No.: US 11,313,293 B2
(45) Date of Patent: Apr. 26, 2022

(54) VAPOR FUEL PROCESSING DEVICE

(71) Applicant: AISAN KOGYO KABUSHIKI KAISHA, Obu (JP)

(72) Inventor: Nobuhiro Kato, Tokai (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 17/259,984

(22) PCT Filed: Jul. 1, 2019

(86) PCT No.: PCT/JP2019/026118
§ 371 (c)(1),
(2) Date: Jan. 13, 2021

(87) PCT Pub. No.: WO2020/071306
PCT Pub. Date: Jan. 23, 2020

(65) Prior Publication Data
US 2021/0285391 A1 Sep. 16, 2021

(30) Foreign Application Priority Data
Jul. 17, 2018 (JP) .............................. JP2018-134418

(51) Int. Cl.
*F02M 1/00* (2006.01)
*F02D 41/00* (2006.01)
(Continued)

(52) U.S. Cl.
CPC ....... *F02D 41/004* (2013.01); *B01D 53/0446* (2013.01); *B01D 53/0454* (2013.01);
(Continued)

(58) Field of Classification Search
CPC ................ F02D 2250/02; F02M 25/08; F02M 25/0836; F02M 25/0872; F02M 25/089; F02M 55/007
(Continued)

(56) References Cited

U.S. PATENT DOCUMENTS 9,689,351 B2 6/2017 Ono
9,695,782 B2 7/2017 Tamura et al.
(Continued)

FOREIGN PATENT DOCUMENTS

| JP | 2016003575 A | 1/2016 |
|----|--------------|--------|
| JP | 2016176337 A | 10/2016 |

(Continued)

OTHER PUBLICATIONS

International Preliminary Examination Report (IPER) for PCT/JP2019/026118 dated Sep. 9, 2020 (9 pages).
(Continued)

*Primary Examiner* — John Kwon
(74) *Attorney, Agent, or Firm* — Shumaker, Loop & Kendrick, LLP (57) ABSTRACT

A vapor fuel processing includes a canister for absorbing vapor fuel, a purge pipe, a purge control valve, a pump, a pressure sensor, and a determination unit. The pump may be provided on the purge pipe upstream of the purge control valve. The pressure sensor may be provided between the purge control valve and the pump. The determination unit may determine a state of a purge path by comparing a first detected value of the pressure sensor detected when the pump is driven with the purge control valve in a cutoff state with a first reference value and then comparing a second detected value of the pressure sensor detected when the pump is driven with the purge control valve in the communicated state with a second reference value.

6 Claims, 5 Drawing Sheets

(51) Int. Cl.
  *B01D 53/04* (2006.01)
  *F02M 25/08* (2006.01)
  *F02M 35/10* (2006.01)

(52) U.S. Cl.
  CPC .... *F02M 25/0836* (2013.01); *F02M 25/0872* (2013.01); *F02M 35/10222* (2013.01); *B01D 2253/102* (2013.01); *B01D 2257/702* (2013.01); *B01D 2259/40086* (2013.01); *B01D 2259/4516* (2013.01); *B01D 2259/4566* (2013.01)

(58) Field of Classification Search
  USPC ................................ 123/516, 518, 520, 522
  See application file for complete search history.

(56) References Cited

U.S. PATENT DOCUMENTS

| | | | |
|---|---|---|---|
| 10,968,869 | B2 | 4/2021 | Kato et al. |
| 2019/0113007 | A1* | 4/2019 | Kato .................. F02D 41/0045 |
| 2019/0271284 | A1* | 9/2019 | Sugiura ............ F02M 35/10222 |
| 2019/0331036 | A1* | 10/2019 | Asanuma .............. F02D 41/003 |
| 2019/0331064 | A1* | 10/2019 | Asanuma ............... F02M 25/08 |

FOREIGN PATENT DOCUMENTS

| | | |
|---|---|---|
| JP | 2017203414 A | 11/2017 |
| JP | 2017203415 A | 11/2017 |
| JP | 2018017172 A | 2/2018 |
| JP | 2018-031361 A | 3/2018 |

OTHER PUBLICATIONS

International Search Report (ISR) for PCT/JP2019/026118 dated Aug. 20, 2019 (5 pages).
Japanese Office Action issued for JP Pat. App. No. 2018-134418 dated Aug. 24, 2021 (12 pages).

* cited by examiner

VAPOR FUEL PROCESSING DEVICE

TECHNICAL FIELD

The present application claims priority based on Japanese patent application No. 2018-134418 filed on Jul. 17, 2018, entire contents of which are incorporated into this description by reference. The present description discloses an art related to a vapor fuel processing device. Especially, it relates to a vapor fuel processing device configured capable of determining a state of a purge path.

BACKGROUND ART

JP 2016-176337 A (hereinbelow termed Patent Document 1) describes a vapor fuel processing device configured to supply vapor fuel generated in a fuel tank to an intake pipe. The vapor fuel processing device of Patent Document 1 is used in a vehicle having a supercharger, and supplies purge gas to upstream and downstream sides of the supercharger. In Patent Document 1, a purge control valve, a pump, and a pressure sensor are disposed on an upstream path that supplies the purge gas to the upstream side of the supercharger. In Patent Document 1, a value of the pressure sensor is detected while driving the pump in a state of having the purge control valve opened (in a state where the purge gas is supplied to the intake pipe) to determine a state (presence/absence of a defect) of the upstream path

SUMMARY OF INVENTION

In Patent Document 1, the state (presence/absence of a defect) of the purge path (upstream path) is determined by comparing a detected value of the pressure sensor and a reference value (pressure threshold). Specifically, it determines that the purge path is in a normal state when the detected value of the pressure sensor is equal to or lower than the reference value, and determines that an abnormality is occurring in the purge path when the detected value of the pressure sensor exceeds the reference value. As such, the vapor fuel processing device of Patent Document 1 can detect the presence/absence of a detect in the purge path (upstream path). However, in Patent Document 1, a portion where the defect is occurring in the purge path (a component in which the defect occurred) and a content of the defect cannot be identified. If the portion where the defect is occurring (and a type of the defect) can be identified when the defect occurs in the purge path, a countermeasure to be taken thereafter can be facilitated. The present description aims to provide a vapor fuel processing device configured capable of identifying a type of a defect when the defect occurs in a purge path.

A first aspect of the disclosure of the present application relates to a vapor fuel processing device configured to supply vapor fuel generated in a fuel tank to an intake pipe connected to an engine. The vapor fuel processing device may comprise a canister, a purge pipe, a purge control valve, a pump, a pressure sensor, and a determination unit. The canister may be configured to absorb the vapor fuel generated in the fuel tank. The purge pipe may include a first pipe configured to supply external air to the canister and a second pipe configured to supply purge gas from the canister to the intake pipe upstream of a throttle valve. The purge control valve may be disposed on the second pipe. Further, the purge control valve may be configured to switch between a communicated state in which the canister and the intake pipe are communicated and a cutoff state in which communication between the canister and the intake pipe is cut off. The pump may be provided on the purge pipe upstream of the purge control valve. Further, the pump may be configured to pump the purge gas from the canister to the intake pipe. The pressure sensor may be provided between the purge control valve and the pump. The determination unit may be configured to determine a state of a purge path based on a detected value of the pressure sensor. In this vapor fuel processing device, the determination unit may determine the state of the purge path by comparing a first detected value of the pressure sensor detected when the pump is driven with the purge control valve in the cutoff state with a first reference value and then comparing a second detected value of the pressure sensor detected when the pump is driven with the purge control valve in the communicated state with a second reference value.

A second aspect of the disclosure of the present application may be the vapor fuel processing device according to the first aspect, wherein the second reference value may comprise a downstream reference value for determining the state of the purge gas downstream of the pressure sensor and an upstream reference value for determining the state of the purge gas upstream of the pressure sensor.

A third aspect of the disclosure of the present application may be the vapor fuel processing device according to the first or second aspect, wherein the vapor fuel processing device may be configured to correct the second reference value based on the first detected value.

A fourth aspect of the disclosure of the present application may be the vapor fuel processing device according to any one of the first to third aspects, wherein the pump may be provided on the second pipe.

Advantageous Effects of Invention

According to the first aspect, a determination on whether or not a defect such as a gas leak is occurring in a range from the pump to the purge control valve can be made by comparing the first detected value and the first reference value. Specifically, if the pump is driving normally and no damage is occurring in the purge path, the detected value of the pressure sensor (closed pressure) increases in accordance with a discharge performance of the pump when the pump is driven with the purge control valve closed. Due to this, by setting the first reference value in accordance with the discharge performance of the pump and comparing the first reference value and the detected value of the pressure sensor (first detected value) obtained when the pump is driven with the purge control valve closed, the determination on whether or not a defect such as a gas leak is occurring in the range from the pump to the purge control valve can be made. A value which is slightly lower than the closed pressure, which is obtained when no defect is occurring in the pump and the purge path, is set as the first reference value. Due to this, inexistence of defects between the pump and purge control valve can be confirmed when the first detected value is higher than the first reference value. On the other hand, when the first detected value is equal to or lower than the first reference value, occurrence of a defect (such as a gas leak and a defect of the pump itself) between the pump purge control valve can be confirmed. The defect of the pump itself may for example be a mechanical defect (such as a failure of a motor), a structural defect (sealing defect of a component constituting the pump), and a complete closure of a pump outlet (or a filter provided at the pump outlet). That is, the defect of the pump itself refers to a state in which gas is not discharged from the pump.

Further, in the first aspect, after comparison of the first detected value and the first reference value has been executed, the detected value of the pressure sensor (second detected value) is obtained by further opening the purge control valve. Here, the purge control valve may be shifted from the cutoff state to the communicated state (closed to open) while the pump is driving, or the pump may be stopped after having obtained the first detected value and may be restarted after having shifted the purge control valve to the communicated state. If the pump is driving normally and the purge gas is flowing normally in the intake pipe when the purge control valve is shifted to the communicated state, the detected value of the pressure sensor exhibits a value (second detected value) that is lower than the first detected value. Due to this, by setting the second reference value in accordance with the discharge performance of the pump and comparing the second detected value and the second reference value, the determination on the state of the purge path (such as whether a defect such as a close is occurring in the purge pipe) can be made. According to the first aspect, not only being able to determine whether a defect is occurring in the purge path, but also a type of the defect can be identified.

According to the second aspect, a position where a defect occurred can be identified in further detail when the defect occurs in the purge path. As aforementioned, when the pump is driven with the purge control valve in the communicated state, the detected value of the pressure sensor (second detected value) becomes lower than the first detected value if the purge path is in a normal state. Due to this, when a defect (clog) is occurring downstream of the pressure sensor, the second detected value becomes higher than its normal value (second reference value). Due to this, by setting the second reference value to a value which is slightly higher than a pressure that is obtained when no defect is occurring in the pump and the purge path, it can be confirmed by comparing the second detected value and the second reference value that no defect is occurring downstream of the pressure sensor when the second detected value exhibits a value lower than the second reference value. On the other hand, when the second detected value is equal to or higher than the second reference value, it can be confirmed that a defect (clog) is occurring downstream of the pressure sensor.

However, when a defect (clog) is occurring upstream of the pressure sensor, a flow rate of the purge gas from the pump to a portion where the pressure sensor is disposed decreases, and the detected value of the pressure sensor (second detected value) becomes lower than its normal value (second reference value). Due to this, by setting the second reference value to a value which is slightly lower than the pressure that is obtained when no defect is occurring in the pump and the purge path, it can be confirmed by comparing the second detected value and the second reference value that no defect is occurring upstream of the pressure sensor when the second detected value exhibits a value higher than the second reference value. On the other hand, when the second detected value is equal to or lower than the second reference value, it can be confirmed that a defect (clog) is occurring upstream of the pressure sensor.

In the second aspect, the second reference value comprises the downstream reference value and the upstream reference value. That is, the second reference value comprises a value slightly higher than the pressure that is obtained when no defect is occurring in the pump and the purge path (downstream reference value) and a value slightly lower than the pressure that is obtained when no defect is occurring in the pump and the purge path (upstream reference value). Due to this, a position where a defect is occurring in the purge path (that is, a type of the defect) can be identified in further detail.

According to the third aspect, the state of the purge path (presence/absence of a defect therein) can more accurately be determined. The first detected value (closed pressure) is dependent on the discharge performance of the pump and a concentration of the purge gas. That is, despite the discharge performance of the pump being same, the first detected value becomes higher with a higher concentration of the purge gas. Similarly, the second detected value also becomes higher with a higher concentration of the purge gas. Due to this, by correcting the second reference value based on the first detected value, the state of the purge path can more accurately be determined. Specifically, the concentration of the purge gas may be estimated from the first detected value, a correction coefficient may be calculated based on the estimated purge gas concentration, and the second reference value may be corrected by multiplying the correction coefficient to the second reference value.

According to the fourth aspect, since an influence of a pressure loss in the canister is not imposed, the determination on the state of het purge path can more accurately be executed.

DETAILED DESCRIPTION (Vapor Fuel Processing Device)

Figure 1:
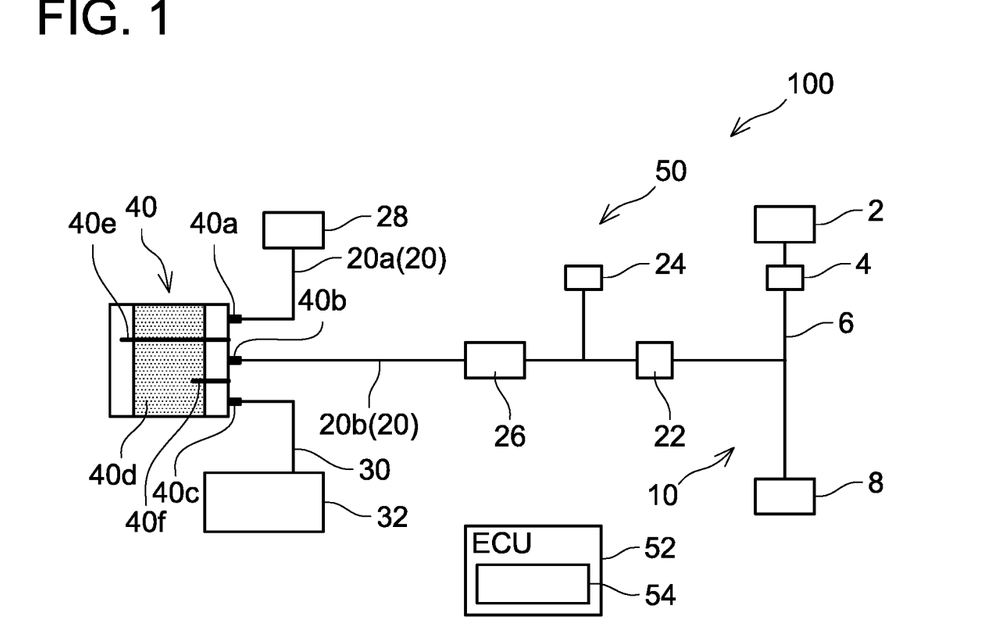
FIG. 1 shows a schematic view of a vapor fuel processing device.

A vapor fuel processing device 100 will be described with reference to FIG. 1. The vapor fuel processing device 100 is mounted in a vehicle such as an automobile. The vapor fuel processing device 100 is provided with an intake system 10 configured to supply air to an engine 2 and a purge gas supply device 50 configured to supply vapor fuel generated in a fuel tank 32 to the intake system 10.

(Intake System)

The intake system 10 is provided with an intake pipe 6, a throttle valve 4, and an air cleaner 8. The intake pipe 6 is connected to the engine 2. The intake pipe 6 is a pipe for supplying the air to the engine 2. The throttle valve 4 is provided on the intake pipe 6. An amount of the air that flows into the engine 2 is controlled by adjusting a degree of opening of the throttle valve 4. That is, the throttle valve 4 is configured to control an air suction amount of the engine 2. The throttle valve 4 is controlled by an Engine Control Unit (ECU) 52.

The air cleaner 8 is connected to the intake pipe 6 upstream of the throttle valve 4. The air cleaner 8 includes a filter configured to remove foreign matters from the air that flows into the intake pipe 6. When the throttle valve 4 opens, the air having passed through the air cleaner 8 flows through the intake pipe 6 and is suctioned into the engine 2. The engine 2 combusts fuel and the air therein and discharges gas to an exhaust pipe (not shown) after combustion. A flow rate sensor (not shown) is disposed in a vicinity of the air cleaner 8. The flow rate sensor is configured to detect the amount of the air that is introduced into the intake pipe 6 from air outside. A supercharger may be disposed upstream of the throttle valve 4 on the intake pipe 6.

(Purge Gas Supply device)

The purge gas supply device 50 is configured to supply the vapor fuel generated in the fuel tank 32 to the engine 2 through the intake pipe 6. The purge gas supply device 50 is provided with a canister 40, a purge pipe 20, a purge control valve 22, a pump 26, and a pressure sensor 24. The canister 40 includes active carbon 40*d* therein, and is configured to absorb the vapor fuel generated in the fuel tank 32 by the active carbon 40*d*. Due to this, the vapor fuel generated in the fuel tank 32 is suppressed from being discharged to the air outside.

The canister 40 is provided with an open air port 40*a*, a purge port 40*b*, and a tank port 40*c*. A first pipe 20*a* is connected to the open air port 40*a*. The first pipe 20*a* connects the open air port 40*a* and the air filter 28. A second pipe 20*b* is connected to the purge port 40*b*. A third pipe 30 is connected to the tank port 40*c*. The third pipe 30 connects the tank port 40*c* and the fuel tank 32. When purge gas is to be supplied (purged) to the intake pipe 6, external air is introduced into the canister through the first pipe 20*a*, and the purge gas is supplied to the intake pipe 6 through the second pipe 20*b*. The first pipe 20*a* and the second pipe 20*b* can collectively be termed the purge pipe 20. Further, a range from an end of the first pipe 20*a* (air filter 28) to an end of the second pipe 20*b* (on an intake pipe 6 side) is a purge path.

As aforementioned, the active carbon 40*d* is housed inside the canister 40. The ports 40*a*, 40*b*, 40*c* are provided on one of wall surfaces of the canister 40 facing the active carbon 40*d*. A space is defined between the active carbon 40*d* and an inner wall of the canister 40 on a side where the ports 40*a* to 40*c* are provided. Further, a first partitioning wall 40*e* and a second partitioning wall 40*f* are fixed to the inner wall of the canister 40 on the side where the ports 40*a* to 40*c* are provided. The first partitioning wall 40*e* separates the space between the active carbon 40*d* and the inner wall of the canister 40 by being located between the open air port 40*a* and the purge port 40*b*. The first partitioning wall 40*e* extends to a space on an opposite side from where the ports 40*a* to 40*c* are provided. The second partitioning wall 40*f* separates the space between the active carbon 40*d* and the inner wall of the canister 40 by being located between the purge port 40*b* and the tank port 40*c*.

The active carbon 40*d* absorbs the vapor fuel from gas that flows from the fuel tank 32 into the canister 40 through the third pipe 30. The gas from which the vapor fuel is removed is discharged to the air outside through the first pipe 20*a* and the air filter 28. The canister 40 can suppress the vapor fuel in the fuel tank 32 from being discharged to the air outside. The vapor fuel absorbed by the active carbon 40*d* is supplied to the second pipe 20*b* as the purge gas by being mixed with the air introduced from the first pipe 20*a*.

The first partitioning wall 40*e* separates a space where the open air port 40*a* is connected and a space where the purge port 40*b* is connected. Due to this, the active carbon 40*d* is interposed on each of passages of the ports 40*a*, 40*b*. The first partitioning wall 40*e* suppresses the gas containing the vapor fuel from being discharged to the air outside and suppresses the gas (air) introduced from the open air port 40*a* from moving directly from the purge port 40*b* to the second pipe 20*b*. Further, the second partitioning wall 40*f* separates a space where the purge port 40*b* is connected and a space where the tank port 40*c* is connected. The second partitioning wall 40*f* suppresses the gas (vapor fuel) that flows in from the tank port 40*c* into the canister 40 from moving directly to the second pipe 20*b*. By providing the first partitioning wall 40*e* and the second partitioning wall 40*f*, mixed gas of the vapor fuel absorbed by the active carbon 40*d* and the air introduced from the first pipe 20*a* is supplied to the second pipe 20*b* as the purge gas.

The purge pipe 20 configures a path (purge path) for supplying the vapor fuel absorbed by the canister 40 to the intake pipe 6 as the purge gas. As aforementioned, the purge pipe 20 includes the first pipe 20*a* and the second pipe 20*b*. The first pipe 20*a* connects the canister 40 and the air filter 28. The air to be supplied to the canister 40 flows in the first pipe 20*a*. The second pipe 20*b* connects the canister 40 and the intake pipe 6. Specifically, the second pipe 20*b* is connected upstream of the throttle valve 4 between the throttle valve 4 and the air cleaner 8. In the case where the supercharger is disposed on the intake pipe 6 upstream of the throttle valve 4, the second pipe 20*b* is connected upstream of the supercharger. The mixed gas (purge gas) of the air supplied to the canister 40 through the first pipe 20*a* and the vapor fuel absorbed by the canister 40 flows in the second pipe 20*b*. Flexible materials such as rubber and resin, and metal materials such as steel may be used as a material of the purge pipe 20.

The purge control valve 22 is disposed on the purge pipe 20 (second pipe 20*b*) downstream of the canister 40. When the purge control valve 22 is in a cutoff state, the purge gas is stopped by the purge control valve 22. When the purge control valve 22 is opened (to shift to a communicated state) and the pump 26 is driven, the purge gas is supplied into the intake pipe 6. Specifically, when the pump 26 is driven, the air is supplied into the canister 40 through the first pipe 20*a*, and the mixed gas (purge gas) of this air and the vapor fuel absorbed by the canister 40 is supplied to the intake pipe 6 through the second pipe 20*b*. The purge control valve 22 is an electronic control valve, and is controlled by the ECU 52. Specifically, duty control of the purge control valve 22 is executed based on signals outputted from the ECU 52. That is, the ECU 52 adjusts an opened duration of the purge control valve 22 by adjusting a duty ratio of the outputted signals. The ECU 52 also executes duty control of the throttle valve 4 similar to the purge control valve 22 and adjusts a degree of opening (opened duration) thereof.

The pump 26 is disposed on the purge pipe 20 (second pipe 20*b*) between the canister 40 and the purge control valve 22. A so-called vortex pump (also termed a cascade pump or a Wesco pump), a centrifugal pump, and the like may be used as the pump 26. The pump 26 is controlled by the ECU 52. Although not particularly limited, a filter for removing foreign matters may be provided on an outlet of the pump 26.

The pressure sensor 24 is disposed between the pump 26 and the purge control valve 22. The pressure sensor 24 is configured to detect a pressure in the purge pipe 20 downstream of the pump 26. The pressure sensor 24 may be of a type configured to detect an absolute pressure, or may be of a type configured to detect a gauge pressure. Further, the pressure sensor 24 may be replaced with a differential pressure sensor configured to detect a pressure difference upstream and downstream sides of the pump 26 (capable of obtaining a detected value which is substantially same as that of the pressure sensor configured to detect the gauge pressure). The detected value of the pressure sensor 24 is inputted to a determination unit 54.

The determination unit 54 is a part of the ECU 52 and is provided integrally with other parts of the ECU 52 (such as a portion that controls the engine 2). However, the determination unit 54 may be separate from the ECU 52. The determination unit 54 includes a CPU and a memory such as a ROM and a RAM. Although details will be described later, the determination unit 54 is configured to determine a state in the purge path (presence/absence of a defect therein) based on a reference value (threshold) stored in the memory and the detected value of the pressure sensor 24.

(Variant of Vapor Fuel Processing Device)

Figure 2:
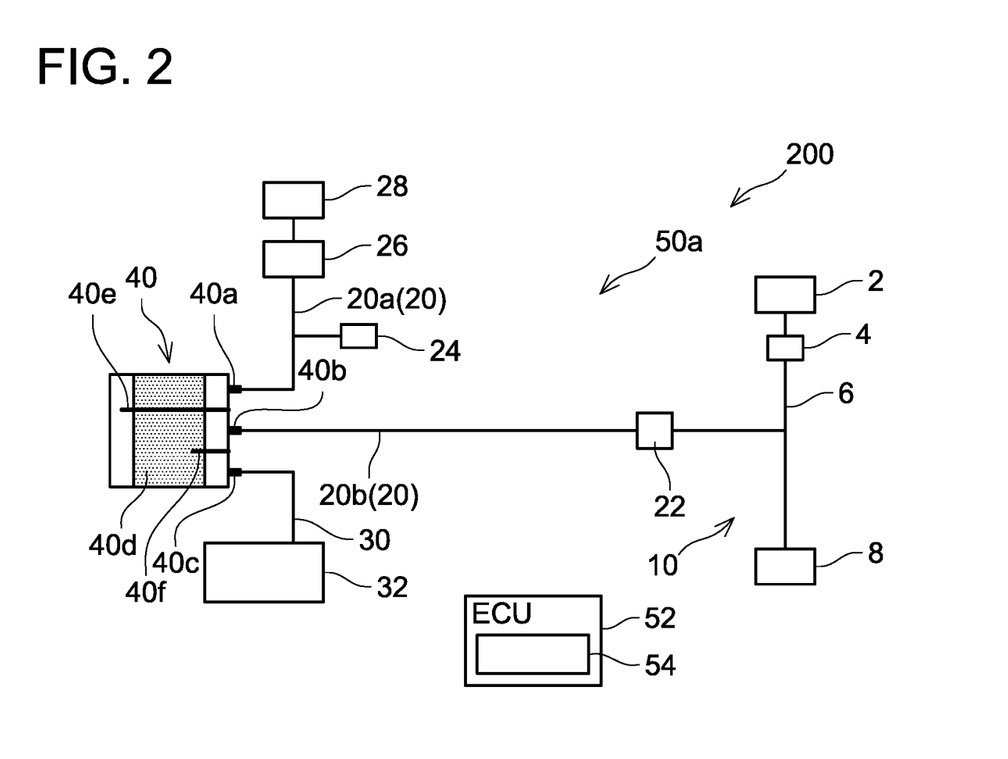
FIG. 2 shows a variant of the vapor fuel processing device.

A vapor fuel processing device 200 will be described with reference to FIG. 2. The vapor fuel processing device 200 is a variant of the vapor fuel processing device 100, and a structure of a purge gas supply device 50a is different from that of the purge gas supply device 50 of the vapor fuel processing device 100. In regard to the vapor fuel processing device 200, configurations that are substantially same as those of the vapor fuel processing device 100 will be given same reference signs as those given to the vapor fuel processing device 100, by which descriptions thereof may be omitted.

In the vapor fuel processing device 200, the pump 26 and the pressure sensor 24 are disposed on the first pipe 20a. Specifically, the pump 26 and the pressure sensor 24 are disposed between the air filter 28 and the canister 40 (open air port 40a). The pressure sensor 24 is disposed downstream of the pump 26 (on a canister 40 side). In the vapor fuel processing device 200 as well, when the purge control valve 22 is opened and the pump 26 is driven, the air is supplied to the canister 40 through the first pipe 20a, and the mixed gas (purge gas) of this air and the vapor fuel absorbed by the canister 40 is supplied to the intake pipe 6 through the second pipe 20b.

(Purge Path State Determination Process 1)

As aforementioned, the determination unit 54 determines the state inside the purge path (presence/absence of a defect) using the detected value of the pressure sensor 24. A purge path internal state determination process 1 in the vapor fuel processing device 100 will be described with reference to FIGS. 3 and 4. The determination unit 54 determines the state of the purge path between the pump 26 and the purge control valve 22 (with the pump 26 and the purge control valve 22 inclusive).

Figure 3:
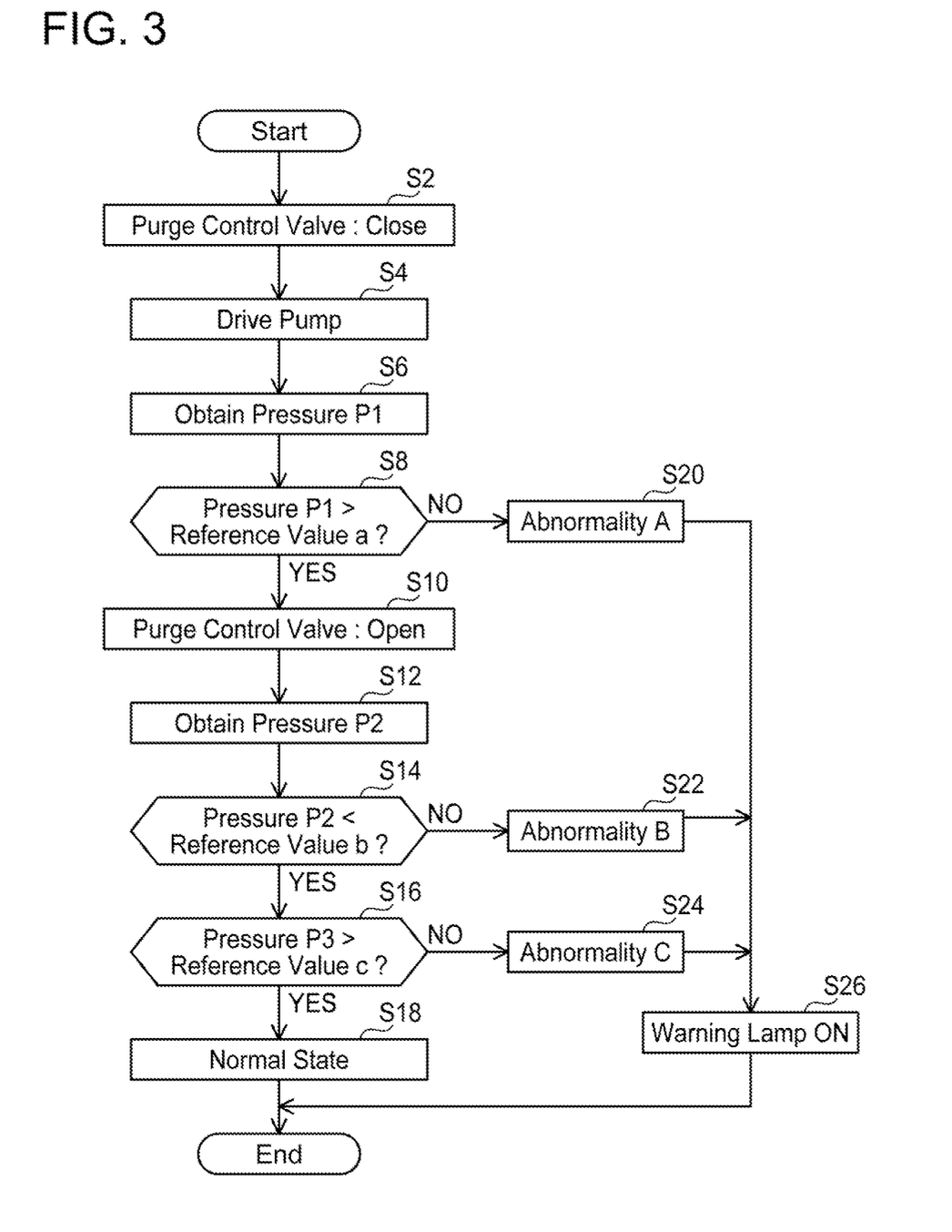
FIG. 3 shows a flow of determining a state of a purge path.

Firstly, the pump 26 is driven (step S4) in a state of having the purge control valve 22 closed (step S2). When the pump 26 is driven in the state of having the purge control valve 22 closed, a pressure between the pump 26 and the purge control valve 22 (detected value of the pressure sensor 24) increases according to an output of the pump 26. However, if a defect is occurring in the pump 26 (such as a sealing defect of a component constituting the pump 26 and a clog of the outlet of the pump 26) or the purge pipe 20 (second pipe 20b) between the pump 26 and the purge control valve 22 is damaged (pipe leak), the pressure between the pump 26 and the purge control valve 22 (detected value of the pressure sensor 24) does not increase sufficiently.

Figure 4:
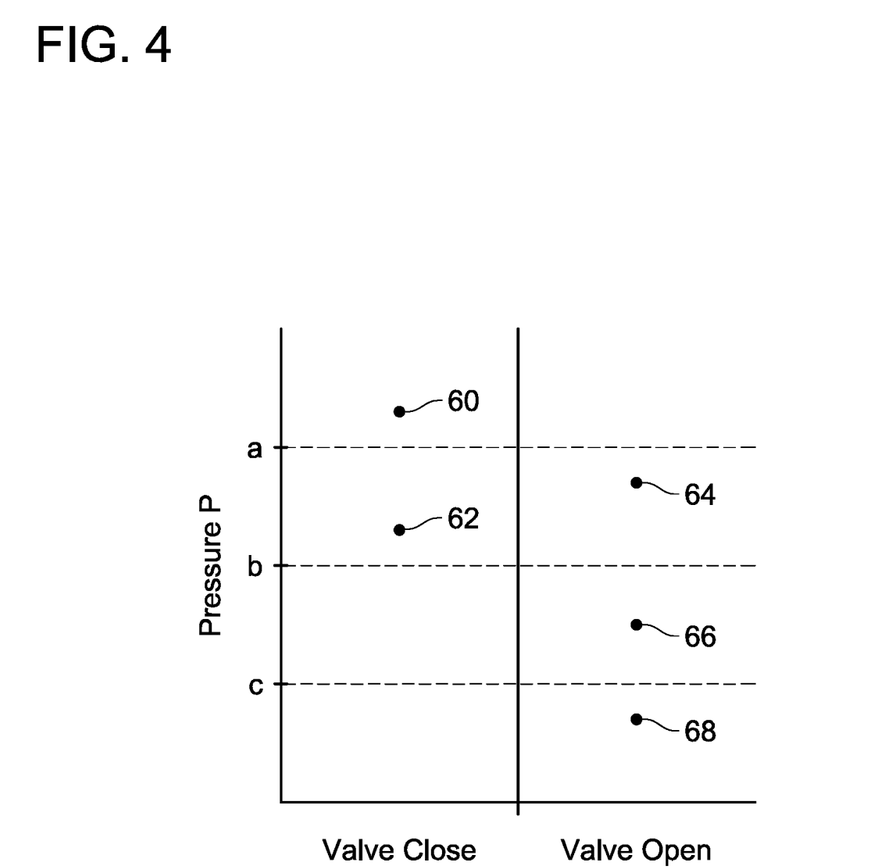
FIG. 4 shows a relationship between the state of the purge path and a detected value of a pressure sensor.

The detected value of the pressure sensor 24 exceeds a reference value a if a defect as aforementioned is not occurring between the pump 26 and the purge control valve 22 (plot 60 of FIG. 4), and becomes lower than the reference value a if the defect as aforementioned is occurring (plot 62 of FIG. 4). The reference value a is a value that is preset in accordance with a performance of the pump 26 and is stored in a memory of the determination unit 54. The reference value a is a threshold for determining whether or not a defect as aforementioned is occurring, and is a value lower than the pressure between the pump 26 and the purge control valve 22 obtained when such defect is not occurring. Hereinbelow, a state in which a defect of the pump 26 itself, a defect such as a damage in the second pipe 20b, or the like is occurring may be termed an "abnormality A".

After having started to drive the pump 26 (step S4), a pressure P1 (first detected value) of a state in which the detected value of the pressure sensor 24 has stabilized is obtained (step S6). Then, a comparison of the pressure P1 and the reference value a is executed in the determination unit 54 (step S8). In a case where the pressure P1 is equal to or lower than the reference value a (step S8: NO, plot 62 of FIG. 4), the determination unit 54 determines that a defect (abnormality A) as above is occurring (step S20) and notifies the same using a warning lamp (not shown) (step S26). In a case where the pressure P1 exceeds the reference value a (step S8: YES, plot 60 of FIG. 4), the determination unit 54 proceeds to step S10 and opens the purge control valve 22 at a predetermined degree of opening.

When the purge control valve 22 is opened, the purge gas is supplied to the intake pipe 6, by which the pressure between the pump 26 and the purge control valve 22 (detected value of the pressure sensor 24) becomes lower than the pressure P1. However, if a clog (partial clog) is occurring in the purge pipe 20 (second pipe 20b) downstream of the pressure sensor 24 or the purge control valve 22 does not open normally (such as a case in which the purge control valve 22 is stuck in its closed state), the flow rate of the purge gas flowing from the purge pipe 20 into the intake pipe 6 decreases, and the detected value of the pressure sensor 24 thereby does not sufficiently decrease. In this case, the detected value of the pressure sensor 24 becomes higher than the reference value b (plot 64 of FIG. 4).

If the purge pipe 20 downstream of the pressure sensor 24 is completely clogged, the detected value of the pressure sensor 24 hardly decreases from the pressure P1 even if the purge control valve 22 is opened (does not decrease from plot 60). That is, the detected value of the pressure sensor 24 becomes lower than a reference value b if a flow path for the purge gas is secured normally downstream of the pressure sensor 24 (plot 66 of FIG. 4) and becomes higher than the reference value b if the flow path for the purge gas is narrowed than its normal state downstream of the pressure sensor 24 (plot 64 of FIG. 4). The reference value b is a threshold for determining whether or not a defect is occurring downstream of the pressure sensor 24, and is a value higher than the pressure between the pump 26 and the purge control valve 22 obtained when such defect is not occurring downstream of the pressure sensor 24. The reference value b is an example of a downstream reference value. Hereinbelow, a state in which a defect is occurring downstream of the pressure sensor 24 may be termed an "abnormality B".

When a partial clog is occurring upstream of the pressure sensor 24, the flow rate of the purge gas to a portion where the pressure sensor 24 is disposed decreases, and the detected value of the pressure sensor 24 decreases than its normal value. In this case, the detected value of the pressure sensor 24 becomes lower than a reference value c (plot 68 of FIG. 4). For example, the detected value of the pressure sensor 24 becomes lower than the reference value c when a partial clog is occurring in the purge pipe 20 (second pipe 20b) upstream of the pressure sensor 24 and when a partial clog is occurring in the outlet of the pump 26 (including the filter provided at the outlet).

The detected value of the pressure sensor 24 becomes higher than the reference value c if the flow path of the purge gas is secured normally upstream of the pressure sensor 24

(plot 66 of FIG. 4) and becomes lower than the reference value c if the flow path for the purge gas is narrowed than its normal state upstream of the pressure sensor 24 (plot 68 of FIG. 4). The reference value c is a threshold for determining whether or not a defect is occurring upstream of the pressure sensor 24, and is a value lower than the pressure between the pump 26 and the purge control valve 22 obtained when such defect is not occurring upstream of the pressure sensor 24. The reference value c is an example of an upstream reference value. Hereinbelow, a state in which a defect is occurring upstream of the pressure sensor 24 may be termed an "abnormality C".

The reference values b and c are values that are preset in accordance with performances of the purge control valve 22 and the pump 26, and are stored in the memory of the determination unit 54. As aforementioned, the reference values b and c are respectively the thresholds for determining whether or not the abnormality B and C are occurring. Due to this, the detected value of the pressure sensor 24 being in between the reference value b and the reference value c indicates that the flow path of the purge gas is secured normally (purge path is in a normal state).

The description now returns to the explanation of the state determination process 1. As shown in FIG. 3, after having opened the purge control valve 22 in a state of driving the pump 26 (step S10), a pressure P2 (second detected value) of the state in which the detected value of the pressure sensor 24 has stabilized is obtained (step S12). Then, a comparison of the pressure P2 and the reference value b and a comparison of the pressure P2 and the reference value c are executed in the determination unit 54 (steps S14, S16). In a case where the pressure P2 is higher than the reference value b (step S14: NO, plot 64 of FIG. 4), the determination unit 54 determines that the "abnormality B" is occurring (step S22) and notifies the same using a warning lamp (not shown) (step S26). On the other hand, in a case where the pressure P2 is lower than the reference value b (step S14: YES), the determination unit 54 proceeds to step S16 and executes a comparison with the reference value c. In a case where the pressure P2 is lower than the reference value c (step S16: NO, plot 68 of FIG. 4), the determination unit 54 determines that the "abnormality C" is occurring (step S24) and notifies the same using a warning lamp (not shown) (step S26). On the other hand, in a case where the pressure P2 is higher than the reference value c (step S16: YES), the determination unit 54 proceeds to step S18 and determines that the purge path is in the normal state. An order of steps S14 and S16 is arbitrary, and step S14 may be executed after having executed step S16.

As aforementioned, in the vapor fuel processing device 100, by detecting the pressure P2 (second detected value) for the case of driving the pump 26 with the purge control valve 22 opened after having detected the pressure P1 (first detected value) for the case of driving the pump 26 with the purge control valve 22 closed, not only the determination is executed for whether or not a defect is occurring in the purge path, but also a type of the defect ("abnormality A", "abnormality B", or "abnormality C") occurring in the purge path can be identified. By identifying the type of the defect, maintenance that needs to be performed thereafter can be facilitated.

(Purge Path State Determination Process 2)

Figure 5:
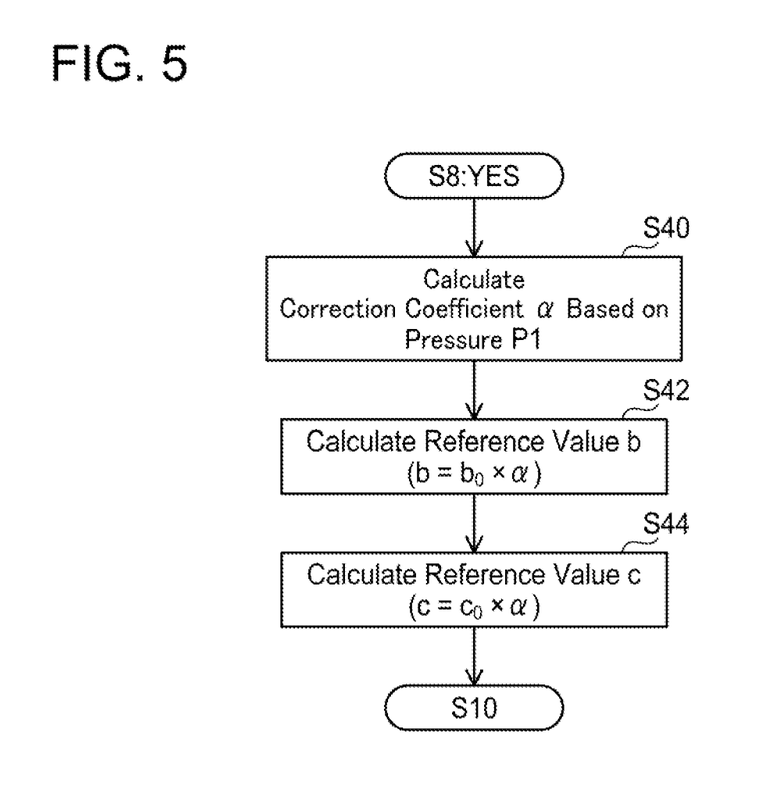
FIG. 5 shows a flow of correcting a second reference value.

As aforementioned, in the vapor fuel processing device 100, the pressure P1 is obtained and thereafter compared with the reference value a, and then the pressure P2 is obtained and thereafter compared with the reference values b and c, by which the determination of the presence/absence of a defect in the purge path is executed and the type of the defect is identified. In the "purge path state determination process 1" as above, the reference values a, b, and c are fixed values stored in the memory of the determination unit 54. However, in a case where the purge gas flow rate is same, the pressure in the purge pipe becomes higher with a higher concentration of the purge gas. Due to this, in the present state determination process, the reference values b and c are corrected according to the purge gas concentration and the thresholds for defect occurrence are changed. Hereinbelow, the state determination process 2 will be described with reference to FIGS. 5 and 6. In the present process, reference values $b_0$ and $c_0$ stored in the memory of the determination unit 54 are corrected and the reference values b and c for the comparisons are calculated between the step of comparing the pressure P1 and the reference value a (step S8) and the step of opening the purge control valve 22 (step S10). That is, in the present process, the determination unit 54 stores the reference values a, $b_0$, $c_0$ for a case where the purge gas concentration is at a specific concentration (such as 20%).

Figure 6:
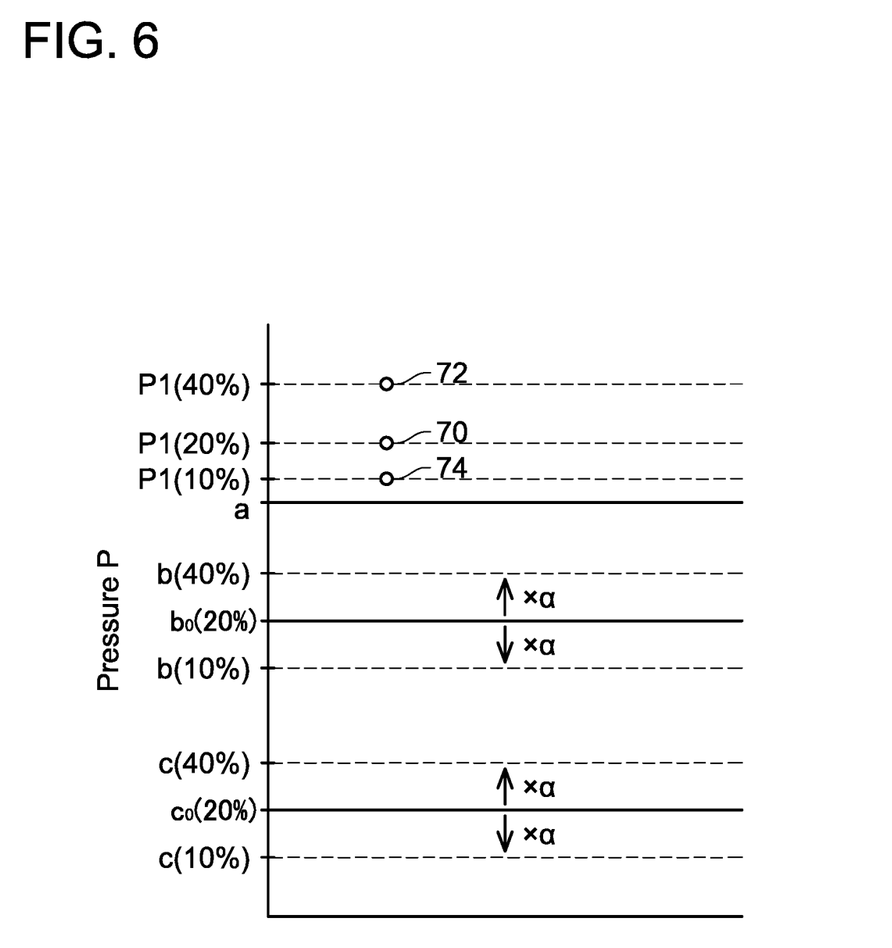
FIG. 6 shows a relationship between a purge gas concentration and a corrected second reference value.

Firstly, in the case where the pressure P1 exceeds the reference value a (step S8: YES), a correction coefficient α is calculated based on the pressure P1 (step S40). For example, as shown in FIG. 6, in a case where the purge gas concentration calculated from the pressure P1 is 20% (plot 70), the correction coefficient α is set to "1". This "1" is multiplied to the reference values $b_0$ and $c_0$ stored in the memory of the determination unit 54 (steps S42, S44) and the comparisons of the pressure P2 are executed. That is, each of the reference values a, $b_0$, $c_0$ stored in the memory of the determination unit 54 is used as-is. In a case where the purge gas concentration calculated from the pressure P1 is 40% (plot 72), a value higher than "1" is set as the correction coefficient α and the reference values $b_0$ and $c_0$ are corrected therewith (steps S42, S44). On the other hand, in a case where the purge gas concentration calculated from the pressure P1 is 10% (plot 74), a value lower than "1" is set as the correction coefficient α and the reference values $b_0$ and $c_0$ are corrected therewith (steps S42, S44). As above, by correcting the reference values b and c based on the pressure P1, the determination on whether or not a defect is occurring in the purge path can be executed more accurately.

In the state determination processes 1, 2 as above, examples of determining the state of the purge path in the vapor fuel processing device 100 were explained, however, the state determination processes as above may be applied to the vapor fuel processing device 200.

Other Embodiments

An important aspect of the art disclosed herein is that, with a canister, a purge control valve, a pump, and a pressure sensor disposed on a purge path, presence/absence of a defect in the purge path is determined based on a detected value of the pressure sensor (closed pressure) when the pump is driven with the purge control valve closed, and thereafter presence/absence of a defect in the purge path is further determined based on the detected value of the pressure sensor when the pump is driven with the purge control valve opened. Due to this, so long as the purge control valve is disposed downstream of the canister and disposing the pump and the pressure sensor, and the purge control valve are disposed in this order from an upstream side of the purge path, positions where these components are disposed are not limited to those exemplified in the embodiments as above. For example, the pump may be disposed on the first pipe and the pressure sensor may be disposed on the second pipe.

Further, the second reference value may not necessarily include with the reference value b (downstream reference value) and the reference value c (upstream reference value). The comparison of the second detected value and the second reference value is executed after having compared the first detected value and the first reference value and confirmed that the "abnormality A" as above is not occurring. Due to this, even if the second reference value is one of the reference value b (downstream reference value) and the reference value c (upstream reference value), the determination on whether or not an abnormality ("abnormality B" or "abnormality C") which is different from the "abnormality A" is occurring can be executed by comparing the second detected value and the second reference value.

Specific examples of the present invention have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The invention claimed is:

1. A vapor fuel processing device configured to supply vapor fuel generated in a fuel tank to an intake pipe connected to an engine, the vapor fuel processing device comprising:
    a canister configured to absorb the vapor fuel generated in the fuel tank;
    a purge pipe including a first pipe configured to supply external air to the canister and a second pipe configured to supply purge gas from the canister to the intake pipe upstream of a throttle valve;
    a purge control valve disposed on the second pipe and configured to switch between a communicated state in which the canister and the intake pipe are communicated and a cutoff state in which communication between the canister and the intake pipe is cut off;
    a pump provided on the purge pipe upstream of the purge control valve and configured to pump the purge gas from the canister to the intake pipe;
    a pressure sensor provided between the purge control valve and the pump; and
    a determination unit configured to determine a state of a purge path based on a detected value of the pressure sensor,
    wherein the determination unit determines the state of the purge path by comparing a first detected value of the pressure sensor detected when the pump is driven with the purge control valve in the cutoff state with a first reference value and then comparing a second detected value of the pressure sensor detected when the pump is driven with the purge control valve in the communicated state with a second reference value and a third reference value closer atmospheric pressure than the second reference value.

2. The vapor fuel processing device according to claim 1, wherein the second reference value comprises a downstream reference value for determining the state of the purge gas downstream of the pressure sensor and an upstream reference value for determining the state of the purge gas upstream of the pressure sensor.

3. The vapor fuel processing device according to claim 2, wherein the vapor fuel processing device is configured to correct the second reference value based on the first detected value.

4. The vapor fuel processing device according to claim 3, wherein the pump is provided on the second pipe.

5. The vapor fuel processing device according to claim 1, wherein the vapor fuel processing device is configured to correct the second reference value based on the first detected value.

6. The vapor fuel processing device according to claim 1, wherein the pump is provided on the second pipe.

* * * * *